United States Patent [19]

Haskell

[11] 4,376,183

[45] Mar. 8, 1983

[54] INORGANIC FILMS WITH POLY(VINYL ALCOHOL) AND COATING COMPOSITIONS FOR MAKING THEM

[75] Inventor: Vernon C. Haskell, Circleville, Ohio

[73] Assignee: E. I. Du Pont de Nemours and Company, Wilmington, Del.

[21] Appl. No.: 301,515

[22] Filed: Sep. 14, 1981

[51] Int. Cl.³ .................................................. C08K 3/32
[52] U.S. Cl. ................................ 524/417; 156/306.6; 428/483; 428/516; 428/518; 428/520; 525/61
[58] Field of Search .......................... 525/61; 524/417

[56] References Cited

U.S. PATENT DOCUMENTS

| | | | |
|---|---|---|---|
| 3,702,844 | 11/1972 | Ofstead | 260/91.3 |
| 3,839,078 | 10/1974 | Birchall et al. | 117/119.6 |
| 3,872,024 | 3/1975 | Hörger | 252/316 |
| 3,926,658 | 12/1975 | Cole et al. | 106/287 |
| 3,955,017 | 5/1976 | Colebourne et al. | 427/383 |
| 3,992,498 | 11/1976 | Morton et al. | 264/63 |
| 4,140,822 | 2/1979 | Dratz | 427/385 |

FOREIGN PATENT DOCUMENTS

74/0117  1/1974  South Africa .

*Primary Examiner*—Stanford M. Levin

[57] ABSTRACT

A substantially continuous, gas-impermeable, film is disclosed including a combination of metal orthophosphate and dialdehyde-treated poly(vinyl alcohol). Barrier properties of a laminate utilizing the film are greatly improved by a heat treatment.

6 Claims, No Drawings

INORGANIC FILMS WITH POLY(VINYL ALCOHOL) AND COATING COMPOSITIONS FOR MAKING THEM

BACKGROUND OF THE INVENTION

1. Field of the Invention

There has long been a need for flexible packaging materials which exhibit a high degree of transparency and provide an effective barrier to gas and moisture permeation. Additionally, there has been need, in such packaging materials, for resistance to high temperatures, and to boiling water in particular, to yield a so-called retortable package. This invention relates to transparent barrier films which can be used, among other things, as one component in flexible packaging materials to yield, among other things, retortable packages.

2. Description of the Prior Art

Coatings have been known which are inorganic in nature and which are made up of aluminum or ferric orthophosphate with some amount of tin, titanium, or zirconium. U.S. Pat. No. 3,853,591 discloses such coatings. Those coatings are transparent and exhibit good barrier qualities but not as good as are desired by users of such products. Moreover packaging materials made with such coatings fail within a few seconds of exposure to boiling water.

Films made from poly(vinyl alcohol), chemically-hardened or not, have been prepared for use in packaging materials but have been found to exhibit moisture sensitivity inconsistent with good, general, barrier properties.

SUMMARY OF THE INVENTION

The present invention provides films with greatly improved moisture and gas impermeability and shaped articles incorporating such films. Shaped articles of the present invention incorporating such films include flexible packaging materials which can be exposed to boiling water without failure.

Specifically, there is provided in accordance with this invention, a coating composition for preparing a substantially continuous, gas-impermeable, film of high barrier quality comprising a homogeneous combination of metal orthophosphate and dialdehyde-treated poly(vinyl alcohol). The metal is primarily aluminum or iron with, if desired, some tin, titanium, or zirconium present. The film of the invention is generally adherent to a shaped article and the most common shaped article is a web or sheet of thermoplastic polymeric material. The web or sheet is preferably laminated together with a sealable topcoat layer and is heat treated to improve the adhesion therewith.

DETAILED DESCRIPTION OF THE INVENTION

Shaped articles which can be coated by films of the present invention include webs, sheets, fibers, containers, and the like prepared from polyesters, polyolefins such as polypropylene, polyethylene and copolymers thereof, including ionomers, the perfluoro polymers prepared from tetrafluoroethylene and hexafluoropropylene, polyacrylonitrile, polyvinyl chloride, polyvinylidene chloride, polyvinyl fluoride, polystyrene, polyimides, polyamides, cellulose acetate, cellophane and the like. Of these, polyester films such as oriented heat-set polyethylene terephthalate and oriented linear polypropylene films are particularly preferred.

The films of the subject invention include a combination of metal orthophosphate and poly(vinyl alcohol) and the film should be about 85 to 98, and preferably 92 to 97, weight percent metal orthophosphate. The poly(vinyl alcohol) should be present in the film in about 2 to 15, and preferably 3 to 8 weight percent.

The films of the subject invention contain either aluminum or iron orthophosphate or combinations thereof with atom ratios of the metal to phosphorus of about from 2.3 to 0.5. It has been found that these compositions provide excellent barrier properties. Up to 50 atom percent, and preferably about 5 to 40 atom percent, of the metal is replaced by tin, titanium, or zirconium. Tin, titanium, or zirconium are not required.

When the metal orthophosphate consists essentially of aluminum orthophosphate, an atom ratio of about from 1.3 to 0.8 has been found to give particularly good barrier properties. In the case of ferric orthophosphate, atom ratios of 1.2 to 0.6, and particularly 0.95 to 0.65, have been found to give especially good barrier properties.

The films of the subject invention also contain poly(vinyl alcohol) in a condensed form obtained by reaction with a dialdehyde. Poly(vinyl alcohol) is prepared by hydrolysis of poly(vinyl acetate). The hydrolysis is normally not carried to completion and it is understood that the poly(vinyl alcohol) used herein may contain a substantial proportion of unhydrolyzed acetate groups. The reaction with a dialdehyde is believed to result in poly(vinyl alcohol) crosslinked to a state of water insolubility. The dialdehyde is also believed to create some chemical linkages between the poly(vinyl alcohol) and the metal orthophosphate material; and between the poly(vinyl alcohol) and whatever sealable topcoat layer may be used to form a laminate product.

The films of the present invention are in a substantially glassy or noncrystalline state. There may be small areas of crystalline film material which may exhibit somewhat reduced flexibility; but moisture and gas barrier properties will not be appreciably affected thereby.

The film can be applied to a substrate article such as a web or sheet of thermoplastic material as a coating composition in the form of a colloidal dispersion or solution. The coating composition medium can be water or an organic solvent such as methanol, acetonitrile or dimethylformamide. Aqueous solutions have been found particularly convenient for most applications, but methanol or ethanol can be used in a dispersion to replace water. Organic solvents are beneficial for use in coating normally water-sensitive substrates such as cellophane. Organic solvents should be selected, of course, so that the coating elements are either soluble or dispersable in the solvent. Polar solvents, preferably having a high dielectric constant, should be used in view of the character of the poly(vinyl alcohol) and the inorganic salts used to formulate the present coatings.

The coating composition can be prepared by first dissolving in a portion of the desired medium all of the inorganic components necessary to obtain the metal orthophosphate; then adding a solution of the poly(vinyl alcohol) and a solution of the dialdehyde along with any other additives which may be desired or required as a part of the coating composition; and, finally, diluting the composition to the desired concentration.

Representative sources of aluminum ion include aluminum chlorhydroxide, aluminum chloride ($AlCl_3 \cdot 6H_2O$), basic aluminum acetate, or aluminum orthophosphate such as that commercially available from the Monsanto Company as "Alkophos." Similar sources of ferric ion can be used, such as ferric chloride ($FeCl_3 \cdot 6H_2O$), ferric nitrate or ferric bromide. Sources of phosphate ion that can be used, in addition to the aluminum orthophosphate indicated above, include phosphoric acid or water-soluble phosphate salts, e.g., sodium orthophosphate or the like, as long as the metal ion is subsequently removed by ion exchange or dialysis. The aluminum or iron and phosphate sources should be added in quantities that will result in atom ratios of aluminum or iron to phosphorus within the required limits. Metals other than aluminum or iron can be added, for example, as halides of the metal.

In the substitution of metals for the aluminum or iron in the present films, differing procedures should be used in the preparation of the coating compositions. For example, when tin is used in conjunction with aluminum, a coating composition can be prepared using 86 percent phosphoric acid, 50 percent aluminum chlorhydroxide solution and $SnCl_4 \cdot 5H_2O$. The coating composition can be prepared by first dissolving the phosphoric acid in water followed by the addition of the aluminum chlorhydroxide. The $SnCl_4 \cdot 5H_2O$ can then be added with stirring, after which an ion exchange resin can be added to remove chloride ions. The order of addition in this formulation is important, since the addition of the tin compound directly to the phosphoric acid would result in precipitation, while the indicated order of addition ties up the phosphoric acid to avoid precipitation.

A substantially similar order of addition can be used when titanium comprises part of the coating formulation. Using titanium tetrachloride in the preparation of the coating solution or dispersion, it is helpful to predissolve the titanium tetrachloride, for example, as a 10 percent solution, in ice water to dissipate the heat of reaction with water. Similar procedures are helpful when incorporating zirconium into the coating formulation, using a 20 percent aqueous solution of basic zirconyl chloride. To add titanium to the coating composition, it has been found to be most convenient to add organo-titanium compounds. Suitable organo-titanium compounds include titanium acetylacetonate, titanium glycolate, and titanium lactate. The acetylacetonate is preferred.

In the preparation of poly(vinyl alcohol) from poly(vinyl acetate), hydrolysis is generally performed such that from 80 to 100 weight percent of the acetate groups have been hydrolyzed to yield hydroxyl groups. Poly(vinyl alcohol) with more than about 20 percent residual acetate groups exhibits low water solubility and is less useful in practice of the present invention. A representative poly(vinyl alcohol) eligible for use in practice of this invention is characterized by being 99 to 100 percent hydrolyzed, having a molecular weight of about 86,000 and having a viscosity of about 28 to 32 centipoises in a 4 percent, by weight, aqueous solution at 20° C. Such a poly(vinyl alcohol) is sold by E. I. du Pont de Nemours and Company, Wilmington, Delaware under the trademark Elvanol 71-30.

Dialdehydes which are eligible for use in this invention include dialdehydes having more than two carbon atoms. Dialdehydes with less than about eight carbon atoms are preferred. Glyoxal has been found ineffective. Succinaldehyde, glutaraldehyde, adipaldehyde, and alpha-hydroxy-adipaldehyde are preferred; and glutaraldehyde is especially preferred. The amount of dialdehyde to be used in the coating composition is dependent upon several factors but depends mostly upon the amount of poly(vinyl alcohol) present. The dialdehyde, consequently, should be used in a mol ratio range of about 2 to 10 vinyl alcohol to dialdehyde. A mol ratio range of about 3 to 5 vinyl alcohol to dialdehyde is preferred.

The concentration of the dispersion is not critical to the invention and can be adjusted to satisfy the requirements of the coating apparatus used and the final coating thickness desired. In general, the dispersions have a solids content of less than about 10 percent, when used with kiss or doctor roll coating techniques.

The dispersion can be coated onto one or both sides of a substrate using any conventional coating technique including, for example, kiss coating, doctor rolls, gravure rolls, immersion coating techniques, spraying, and the like, with or without such expedients as Mayer rods or air doctor knives. The dispersion is preferably applied to the substrate within a relatively short period after preparation, since extended aging of the dispersion, e.g., longer than 24 hours, permits slight gelation of the coating material. The coating thickness should be such as to give a final coating weight of at least 0.02 g/m$^2$ on the coated surface, and preferably about from 0.1 to 0.6 g/m$^2$.

The dispersion can be applied, for better adhesion, to a substrate that has been pretreated. Treatments which can be used include flame treatment, electrical discharge or corona treatment, as well as acid or alkaline etching of the substrate surface. In general, conventional flame or corona treatment is preferred.

After application of the dispersion, the coated substrate is dried at elevated temperatures to remove excess water from the dispersion. Water of hydration as well as free water is removed during this drying step. Removal of water of hydration is believed to increase adhesion of the film to the substrate. Drying times and temperatures will vary widely, depending, for example, on the composition of the substrate article, the chemical composition of the coating, the concentration of the coating sol, the coating thickness, and the air flow in the drier. Coated films are conveniently dried by passing through a tower with radiant heat and countercurrent air flow. When organic solvents are used for application of the coatings, substantially all of the solvent should be removed, including the solvated residues that have become chemically attached to the inorganic oxides.

The coatings applied from aqueous systems should be dried to the normal water content of the coating, generally less than about 80% by weight of the coating. In general, the amount of water necessary in the coating will decrease with increasing quantities of poly(vinyl alcohol) present in the coating. Excessive residual water or incomplete drying can cause discontinuities in the coating. Similarly, drying at an exceptionally fast rate will disrupt the coating structure to give poor barrier properties.

After completion of the drying of the phosphate coating, the coated film can be further treated by applying a sealable topcoat of a polymeric material such as polyethylene, polypropylene, vinylidene chloride polymers and copolymers, and ethylene vinyl acetate. The top coating can be applied by solvent coating, conventional melt extrusion techniques, hot lamination of a preformed film of the heat sealable polymer, or polymer dispersions. It has been found that the barrier properties of films of the invention are often markedly improved when sealable polymer topcoats are applied. The improvement so realized is generally substantially greater than the expected additive effect of the barrier properties of the two coatings.

The application of a sealable topcoat to the inorganic coatings of the present invention is particularly preferred for several reasons. In addition to imparting sealability to the surface, the topcoat improves the impact and abrasion resistance of the coated films of the present invention. In addition, the extent to which the coated films can be elongated without depreciating the barrier properties is increased. Most significantly, however, is the further improvement in barrier properties that the sealable topcoat provides. While the mechanism for this improvement is not fully understood, it is postulated that the sealable topcoat seals minute pores or fissures that are present in the organic barrier layer. In general, it is recognized that the total permeability ($P_t$) of a composite varies with the permeability of the individual components ($P_1$, $P_2$, etc.) by the following relationship:

$$1/P_t = 1/P_1 + 1/P_2$$

It has been found that the improvement realized through the applications of a sealable topcoat in accordance with the instant invention decreases gas and water vapor permeability to an extent greater than would be expected from this standard relationship.

The sealable topcoat which is especially preferred is a polyolefin or other sealant film thermally laminated to the dried inorganic coating. Adhesive lamination can be used, for example, polyurethane-based resin, is a useful adhesive in such use, but thermal lamination is preferred as yielding the highest laminate bond strengths. Polyethylene film of a low density is preferred for the sealant coating and it has been found that adhesion is improved by corona treatment of the polyethylene film before the lamination and by heating for particular times after the lamination. After lamination, when polyethylene is used as the sealable topcoat, it is preferred that the laminate should be heat treated at, for example, 180° C. for 2-10 minutes or 100° C. for 2-6 hours or, if there is danger that the laminate in roll form would block at that temperature, 60° C. for 1-4 days.

Lower heat treatment temperatures require longer heat treatment times. An empirical relationship for heat treatment temperature and times which, when followed, provides conditions suitable to decrease sensitivity of the laminate to water is heating of from about 60° C. to about 30° C. below the melting temperature of the substrate for about 1-4 days at 60° C. and for times which are halved from that for each 15° C. increase above 60° C.

The heat treatment of the laminate is necessary to provide the so-called retortability of the product of this invention. The heat treatment greatly decreases sensitivity of the laminate to water. The heat treated laminate has been found to exhibit excellent oxygen and water barrier properties and, also, has been found to exhibit high heat seal peel strengths even after and during immersion in boiling water. The heat treated laminate of this invention can, therefore, be used to make packages with heat sealed seams whose contents can be heated by immersing the packages in boiling water.

After drying of the metal phosphate coating, the composition of the coating can be verified using an X-ray emission spectrometer equipped with chromium and tungsten target X-ray tubes, and sample holders permitting irradiation of flat film specimens. In the use of this equipment, any topcoat is first removed from the inorganic coating by immersing the film specimen in tetrahydrofuran or hot toluene, depending on the topcoat involved. The sample is then rinsed until free of polymer and dried in an oven for 10 minutes at 120° C. The film specimen is then irradiated in an X-ray spectrometer equipped with a chromium target tube and pentaerythritol crystal and scan angles. Peaks of intensity of secondary X-rays for aluminum phosphate will be observed at 89.40° for phosphorus and 144.67° for aluminum. A similar procedure can be used to identify ferric phosphate, using a tungsten target tube to identify and measure iron.

For measurements of the aluminum to phosphorus ratio, standard film samples should be prepared having known amounts of aluminum and phosphorus expressed in grams per unit area. The base film from the same lot as that used to make the standards should be available for a blank measurement of secondary radiation. Factors for both aluminum and phosphorus should be separately calculated by measuring the counts per unit time at 89.40° and at 144.67° for the known sample and subtracting the counts at the same setting for the blank and dividing grams per unit area of aluminum by the net counts. The counts per unit time from the test sample at 89.40° and 144.67° should then be measured and the counts from the blank subtracted, after which the result should be multiplied by the factor for aluminum. The procedure is then repeated for phosphorus and the atom ratio of aluminum to phosphorus is obtained by dividing the grams per unit area by the atomic weight and establishing the ratio.

DESCRIPTION OF THE PREFERRED EMBODIMENTS

EXAMPLE 1

In this example films were prepared from coating compositions having different amounts of poly(vinyl alcohol) and dialdehyde; and the films were then coated onto a substrate and laminated with a sealable topcoat to make a laminate structure. The laminate structure was heat treated and the heat treated laminate was also evaluated.

The coating compositions were made by combining components, under agitation, in the order and amounts as follows, all amounts being in parts by weight:

| Component | Samples | | | |
|---|---|---|---|---|
| | 1 | 2 | 3 | 4 |
| Water | 50 | 50 | 50 | 50 |
| $H_3PO_4$ (85%) | 7.8 | 7.8 | 7.8 | 7.8 |
| $Al_2(OH)_5Cl$ (50%) | 9.4 | 9.4 | 9.4 | 9.4 |
| $SnCl_4 \cdot 5H_2O$ | 0.58 | 0.58 | 0.58 | 0.58 |
| Titanium acetylacetonate[1] | 8.0 | 8.0 | 8.0 | 8.0 |
| poly(vinyl alcohol)/ glutaraldehyde[2] | 2.0 | 4.0 | 6.0 | 8.0 |
| 1-butanol | 3.0 | 3.0 | 3.0 | 3.0 |
| water | final dilution to 133 parts | | | |

[1]Titanium acetylacetonate as sold by E. I. du Pont de Nemours and Company under the trademark designation "Tyzor AA" heated with equal parts of 3 wt % HCl to 85° C. and then cooled for purposes of stabilization.
[2]25 parts poly(vinyl alcohol) (5%) as sold by E. I. du Pont de Nemours and Company under the trademark designation "Elvanol 71-30" combined with 2.1 parts glutaraldehyde (50%).

The compositions were coated onto a substrate of smooth, biaxially oriented, polyethylene terephthalate web 16.7 centimeters wide having the side to be coated corona treated. The coatings were applied by a kiss coating roll with a film speed of 53 millimeters/second, a kiss coating roll diameter of 51 millimeters, and a cocurrent kiss roll surface velocity of 25.4 millimeters/second. The film substrate web had a transverse stretch of about 4.1. The coatings were dried using radiant heat adjusted to provide 3 percent transverse direction shrinkage. The heat required for such shrinkage corresponds to a film temperature of about 130° C. at the exit end of the dryer which was about 60-70 centimeters long.

The following measurements were made on the resulting coated films.

1. Coating weight in g/m² was obtained by weighing 0.1 m² of the coated film, immersing the coated film in 10% nitric acid for 1 hour, rinsing in distilled water, wiping dry with cellulose tissue, drying in an oven at 110° C. for 30 minutes and reweighing. The coating weight is the weight loss of the sample multiplied by 10.

2. Water vapor transmission rate (WVTR) at 39° C. and 100% relative humidity was measured with an Infrared Diffusometer purchased from Modern Controls Corp.

3. Oxygen transmission rate (OTR) was measured at 30° C. with the instrument identified as Oxtran 100 supplied by Modern Controls Corp.

4. Boil resistance was measured by immersing a preweighed sample of coated film in boiling water for 10 minutes, wiping the film dry, oven drying for 30 minutes at 110° C., reweighing and reporting the loss of weight as a percentage of the original coating weight. Characteristics of the coated webs before lamination and without heat treatment were as follows:

|  | Sample | | | |
|---|---|---|---|---|
|  | 1 | 2 | 3 | 4 |
| Coating weight (g/m²) | 0.24 | 0.26 | 0.22 | 0.44 |
| WVTR (g/m².day) | 1.7 | 2.3 | 4.0 | 6.7 |
| OTR (cc/m².day) | 0.46 | 0.12 | 0.17 | 0.20 |
| 10 min. in boiling H₂O, % coating lost | 0 | 0 | 1 | 5 |

The coated films, in sheet form, were each tack sealed to a 50 micrometer topcoat film of a low density polyethylene by passing them through a nip at 100° C. The sheets were then clamped to a curved, polished, metal plate and heat treated in an oven at 130° C. for 5 minutes. Properties of the resulting laminates were as follows:

|  | Samples | | | |
|---|---|---|---|---|
|  | 1 | 2 | 3 | 4 |
| WVTR (g/m².day) | 0.39 | 0.57 | 1.29 | 1.38 |
| OTR (cc/m².day) | 0.12 | 0.10 | 0.11 | 0.12 |
| 10 minutes boiling H₂O, Finger Shear test[1] | Fail | Fail | Fail | Pass |
| Dry Bond strength (g/in) | 1530 | 1486 | 1498 | 1560 |

[1]In the finger shear test, a laminate is removed from the boiling water and immediately rubbed between thumb and forefinger. Separation of any layers of the laminate indicates failure.

EXAMPLE 2

To further demonstrate the effect of heat treating laminates made in accordance with this invention, laminates of Samples 3 and 4 from Example 1 were exposed to several different heat treatment conditions and the resulting laminate structures were evaluated as indicated below.

|  | Sample 3 | | | | |
|---|---|---|---|---|---|
|  | 1 | 2 | 3 | 4 | 5 |
| Heating time (hr at 110° C.) | 1 | 2 | 5 | 16 | 64 |
| WVTR (g/m².day) | 1.26 | 0.96 | 0.54 | 0.45 | 0.43 |
| OTR (cc/m².day) | 0.40 | 0.26 | 0.45 | 0.26 | 0.26 |
| 10 minutes in boiling H₂O Shear grade (0-2)[1] | 0 | 1 | 1 | 2 | 0 |
| 25° dry peel (g/in) | 1723 | 2400 | 2388 | 2738 | 2925 |
| 25° wet peel (g/in) | 470 | 320 | 1170 | 400 | 530 |

|  | Sample 4 | | | | |
|---|---|---|---|---|---|
|  | 1 | 2 | 3 | 4 | 5 |
| Heating time (hr at 110° C.) | 1 | 2 | 5 | 16 | 64 |
| WVTR (g/m².day) | 1.91 | 0.90 | 0.54 | 0.45 | 0.43 |
| OTR (cc/m².day) | 0.40 | 0.26 | 0.45 | 0.26 | 0.26 |
| 10 min in boiling H₂O, Shear grade (0-2)[1] | 0 | 0 | 0 | 1 | 0 |
| 25° dry peel (g/in) | 1723 | 2400 | 2388 | 2738 | 2925 |
| 25° wet peel (g/in) | 470 | 320 | 1170 | 400 | 530 |

[1]Shear grade is a measure of the degree of laminate layer adhesion remaining after immersion in boiling water - 0 indicates no adhesion, 1 is partial adhesion, and 2 is adhesion over the entire sample.

These data indicate that resistance to boiling water is markedly improved when poly(vinyl alcohol) and glutaraldehyde concentrations are increased above a threshold level; and that both barrier and boil resistance are increased by increasing curing times at 110° C. Similar results and improvement would be expected for films using iron as the primary metal in the coating composition.

EXAMPLE 3

In this example, a laminate structure was made using cast polypropylene as the sealable topcoat. The laminate structure of this example would be useful as retortable barrier packaging material.

Coating compositions were prepared as in Example 1 except that the amount of poly(vinyl alcohol) and dialdehyde was changed as follows:

|  | Sample | | | |
|---|---|---|---|---|
| Component | 1 | 2 | 3 | 4 |
| poly(vinyl alcohol) (5%) | 12.0 | 12.0 | 12.0 | 12.0 |
| glutaraldehyde (50%) | 0.25 | 0.50 | 0.75 | 1.00 |

The compositions were coated onto polyethylene terephthalate substrate as was done in Example 1 and the resulting coated film exhibited the following characteristics:

|  | Sample | | | |
|---|---|---|---|---|
|  | 1 | 2 | 3 | 4 |
| Coating weight (g/m$^2$) | 0.18 | 0.20 | 0.22 | 0.16 |
| WVTR (g/m$^2$.day) | 10.1 | 10.7 | 12.1 | 9.8 |
| OTR (cc/m$^2$.day) | 0.09 | 0.42 | 0.39 | 0.57 |
| 10 minutes in boiling H$_2$O, % coating lost | 67 | 55 | 73 | 63 |

The coated films were laminated with 75 micrometers cast polypropylene sealable topcoat and the laminate was heated for five minutes at 180° C. The heat treated laminate structure exhibited the following characteristics:

|  | Sample | | | |
|---|---|---|---|---|
|  | 1 | 2 | 3 | 4 |
| WVTR (g/m$^2$.day) | 1.3 | 2.8 | 3.0 | 4.9 |
| OTR (cc/m$^2$.day) | 0.17 | 0.19 | 0.34 | 1.00 |
| Dry peel (25° C.) (g/in) | 418 | 293 | 265 | 435 |
| Wet peel (25° C.) (g/in) | 330 | 170 | 300 | 450 |
| 10 minutes in boiling H$_2$O, Shear grade | 2 | 2 | 2 | 2 |
| 10 minutes in boiling H$_2$O, peel strength (g/in) | 90 | No peel | No peel | No peel |
| 15 minutes in 1 atm. steam % separation | 0 | 10 | 80 | 0 |
| peel (g/in) | 75 | 120 |  | 160 |

1 Peel could not be started

Excellent resistance to boiling water is demonstrated by all of the samples of this example. Samples 1 and 4, in the lack of layer separation under steam heat, exhibit retortable quality.

I claim:

1. A substantially continuous, gas-impermeable, film of high barrier quality comprising a homogeneous combination of:
(i) 85 to 98 weight percent metal orthophosphate wherein the atom ratio of metal to phosphorus is from 0.5 to 2.3 and the metal is more than 50 atom percent aluminum or iron and less than 50 atom percent tin, titanium, or zirconium; and (ii) 2 to 15 weight percent poly(vinyl alcohol) reacted with a dialdehyde having more than two and less than eight carbon atoms.

2. The film of claim 1 wherein the dialdehyde is selected from the group consisting of succinaldehyde, glutaraldehyde, adipaldehyde, and alpha-hydroxy adipaldehyde.

3. The film of claim 1 wherein the film comprises 3 to 8 weight percent poly(vinyl alcohol) reacted with glutaraldehyde in about a 2 to 10 mol ratio range of vinyl alcohol to glutaraldehyde.

4. The film of claim 3 wherein the mol ratio range of vinyl alcohol to glutaraldehyde is 3 to 5.

5. The film of claim 1 wherein the metal is more than 60 atom percent aluminum and less than 40 atom percent tin or zirconium and the film also includes 2 to 10 atom percent of titanium.

6. A coating composition comprising an aqueous dispersion having less than 10 weight percent solids of which 85 to 98 weight percent is metal orthophosphate formed from metal and phosphate wherein more than 50 atom percent of the metal is aluminum or iron and less than 50 atom percent of the metal is tin, titanium, or zirconium and of which 2 to 15 weight percent is poly(vinyl alcohol) and a dialdehyde having more than two and less than eight carbon atoms, the dialdehyde being present in a mol ratio range of 2 to 10 vinyl alcohol to dialdehyde.

* * * * *